United States Patent
Swinney et al.

(10) Patent No.: US 12,522,549 B2
(45) Date of Patent: Jan. 13, 2026

(54) PROCESS FOR REFINING A CRUDE ETHYLENE GLYCOL STREAM

(71) Applicant: JOHNSON MATTHEY DAVY TECHNOLOGIES LIMITED, London (GB)

(72) Inventors: John Swinney, Stockton-on-Tees (GB); Paul Gordon, Stockton-on-Tees (GB); David John Watson, Stockton-on-Tees (GB); Graham Reed, London (GB)

(73) Assignee: Johnson Matthey Davy Technologies Limited, London (GB)

( * ) Notice: Subject to any disclaimer, the term of this patent is extended or adjusted under 35 U.S.C. 154(b) by 517 days.

(21) Appl. No.: 18/002,914

(22) PCT Filed: Sep. 3, 2021

(86) PCT No.: PCT/GB2021/052276
§ 371 (c)(1),
(2) Date: Dec. 22, 2022

(87) PCT Pub. No.: WO2022/049387
PCT Pub. Date: Mar. 10, 2022

(65) Prior Publication Data
US 2023/0257332 A1    Aug. 17, 2023

(30) Foreign Application Priority Data
Sep. 4, 2020 (GB) ..................... 2013908

(51) Int. Cl.
*C07C 29/88* (2006.01)
*C07C 51/12* (2006.01)
*C07C 67/08* (2006.01)

(52) U.S. Cl.
CPC .............. *C07C 29/88* (2013.01); *C07C 51/12* (2013.01); *C07C 67/08* (2013.01)

(58) Field of Classification Search
CPC ....... C07C 29/88; C07C 31/202; C07C 51/12; C07C 59/06; C07C 67/08
See application file for complete search history.

(56) References Cited

U.S. PATENT DOCUMENTS

| 4,225,394 A | 9/1980 | Cox et al. |
| 8,785,686 B2 * | 7/2014 | Barnicki ................. C07C 51/48 562/580 |
| 8,829,234 B2 | 9/2014 | Barnicki et al. |

(Continued)

FOREIGN PATENT DOCUMENTS

| CN | 101972660 A * | 2/2011 | ............. Y02P 20/52 |
| CN | 103086887 A | 5/2013 | |

(Continued)

OTHER PUBLICATIONS

Wu, Common Knowledge Evidence: "Green chemistry", Southwest Jiaotong University Press, pp. 167-168, Dec. 31, 2010, 2010.

*Primary Examiner* — Yate' K Cutliff
(74) *Attorney, Agent, or Firm* — BakerHostetler (57) ABSTRACT

A process for refining a crude ethylene glycol stream comprising monoethylene glycol and at least one acid contaminant is disclosed. The process comprises reacting the acid contaminant with the monoethylene glycol in at least one reaction zone to form an ester and removing the ester in a separation step.

27 Claims, 3 Drawing Sheets

(56) References Cited

U.S. PATENT DOCUMENTS

| | | | |
|---|---|---|---|
| 11,198,664 B2 | 12/2021 | Jackson et al. | |
| 2001/0039364 A1* | 11/2001 | Drent | C07C 29/149 |
| | | | 568/457 |
| 2013/0331605 A1 | 12/2013 | Janka et al. | |
| 2017/0327446 A1 | 11/2017 | Zhang et al. | |

FOREIGN PATENT DOCUMENTS

| | | | | |
|---|---|---|---|---|
| CN | 104220414 | A | 12/2014 | |
| CN | 110831918 | A | 2/2020 | |
| CN | 107778140 | B | 9/2020 | |
| TW | 201904923 | A | 2/2019 | |
| WO | 2014/035740 | A1 | 3/2014 | |
| WO | 2017/091531 | A1 | 6/2017 | |
| WO | WO-2019002839 | A1 * | 1/2019 | ............ C07C 29/80 |
| WO | 2021/050749 | A1 | 3/2021 | |

* cited by examiner

PROCESS FOR REFINING A CRUDE ETHYLENE GLYCOL STREAM

FIELD OF THE INVENTION

The present invention relates to a process for refining a crude ethylene glycol stream. In particular, but not exclusively, the present invention relates to a process for refining a crude ethylene glycol stream produced by hydrogenating a stream comprising methylglycolate. The stream comprising methylglycolate is preferably produced by esterifying a stream comprising glycolic acid, which is preferably produced by reacting formaldehyde and carbon monoxide.

BACKGROUND

Mono ethylene glycol (MEG) is typically industrially produced from ethylene via an ethylene oxide intermediate. The ethylene oxide reacts with water to produce MEG. However, other routes are available, including the hydrogenolysis of dimethyl oxalate, obtained for example via the oxidation of carbon monoxide with methyl nitrate, or the hydrogenation of methylglycolate. Methylglycolate can be obtained for example by reacting 1,2-diols, or a 1,2 diol and a primary alcohol, with oxygen. Methylglycolate can also be obtained from the esterification of glycolic acid with methanol. A process for the production of MEG offered by Johnson Matthey Davy Technologies involves the reaction of formaldehyde with carbon monoxide to produce glycolic acid. The glycolic acid is esterified with methanol to produce methylglycolate, which is hydrogenated to form MEG. Processes for producing MEG typically also produce di-ethylene glycol (DEG) and the unrefined product of such processes is therefore a crude ethylene glycol stream comprising MEG and DEG. Some processes will contain very little DEG. For example, being 90% or even 99% selective to MEG.

Specifications for final MEG products may depend on the use to which the MEG product is being put. However, the specifications will typically require minimum levels of MEG and maximum levels of DEG. For example, ASTM E2470-09 (Reapproved 2015) "Standard Specification for Polyester Grade Ethylene Glycol" requires a minimum MEG content of 99.9% (m/m) and a maximum DEG content of 0.05% (m/m). The crude ethylene glycol stream therefore typically requires refining to produce a refined MEG product stream. Note that "% (m/m)" denotes percentage by mass.

The specifications also provide upper limits on other contaminants. For example, the ASTM E2470-09 standard has a maximum acidity (as Acetic Acid) of 0.002% (m/m) as determined by ASTM Test Method E2679. In China, the China National Standard GB/T 14571.1-2016 "Test method of monoethylene glycol for industrial use—Part 1: Determination of acidity—Titration method" has a maximum acid content of 10 ppmw (that is, 0.001% (m/m)). Depending on the production method used, it may be necessary to reduce the level of acid contaminants in the crude ethylene glycol stream in order to meet that specification. The refining of the crude ethylene glycol stream would typically be carried out by distillation. However, removing acid contaminants by distillation may be difficult and/or uneconomical, for example if the acid contaminants have boiling points that are close to the desired MEG or DEG products. To assist with the removal it is, for example, known to add a base to neutralise acid components. However, the addition of base may be undesirable in that it adds a further component to the system. That may, for example, necessitate greater purging of recycle streams to prevent build up of contaminants, with an associated loss of potential product.

Preferred embodiments of the present invention seek to overcome one or more of the above disadvantages of the prior art. In particular, preferred embodiments of the present invention seek to provide improved processes for refining a crude ethylene glycol stream.

SUMMARY OF INVENTION

According to a first aspect of the invention, there is provided a process for refining a crude ethylene glycol stream comprising monoethylene glycol and at least one acid contaminant, the process comprising reacting the acid contaminant with the monoethylene glycol in at least one reaction zone to form an ester and removing the ester in a separation step.

Preferably the crude ethylene glycol further comprises diethylene glycol, and the process comprises reacting the acid contaminant with at least one of the monoethylene glycol or the diethylene glycol.

The crude ethylene glycol stream preferably comprises at least 30% (m/m) monoethylene glycol (MEG), more preferably at least 40% (m/m) MEG and yet more preferably at least 50% (m/m) monoethylene glycol (MEG). The crude ethylene glycol stream preferably comprises at least 0.5% (m/m) diethylene glycol (DEG), more preferably at least 1% (m/m) DEG.

By reacting the acid contaminant with the MEG or the DEG, an ester is formed that is easier to then separate, for example by distillation, than the original acid contaminant. By forming the ester from an existing component of the crude ethylene glycol stream, no new components are added to the system. The separated ester can be recycled back to an upstream point of the process, for example a hydrogenation, so there is potentially no loss of product. Even if the separated ester is not recycled, because the level of the acid contaminant is typically low, for example less than 1% (m/m), the loss of MEG or DEG is low. The large excess of MEG, and DEG, compared to the acid contaminant also helps drive the esterification reaction at a good rate, making the process a cost-effective way of removing the acid contaminant. Preferably the crude ethylene glycol stream therefore comprises less than 5% (m/m), more preferably less than 2% (m/m) and most preferably less than 1% (m/m) of the acid contaminant. The crude ethylene glycol stream preferably comprises at least 0.01% (m/m) and more preferably at least 0.05% (m/m) of the acid contaminant.

The esterification reaction is typically an equilibrium limited reaction and as such it may be desirable to remove the reaction products, such as water, to help drive the equilibrium to convert enough of the acid contaminant to meet the maximum acid content of the product specification. The process thus preferably comprises one or more water removal steps.

If there is water present in the crude ethylene glycol stream it may be desirable to have a water removal step, for example in a distillation column, before the reaction zone. For convenience of reference, such a water removal step may be termed in this application a low boiler separation and, where the low boiler separation is a distillation column, it may be termed a low boiler distillation column. The low boiler separation may also remove other 'low boilers' in addition to water. For example, the low boiler separation may remove alkanols such as methanol. In a particularly preferred embodiment, the MEG, and DEG if present, are produced by hydrogenation of alkyl glycolate, which is in turn produced by esterification of glycolic acid with an alkanol. Some of the alkanol may remain in the crude ethylene glycol stream following the hydrogenation and that alkanol may be removed in the low boiler separation. Preferably the alkyl glycolate is methyl glycolate and the alkanol is methanol. The crude ethylene glycol stream may therefore comprise the MEG, optionally the DEG, the acid contaminant, water and alkanol, preferably methanol, and may be fed to the low boiler distillation column where separation occurs such that the alkanol and water are recovered overhead and a stream comprising the MEG, the DEG if present, and the acid contaminant is passed to the reaction zone or a first of the reaction zones. In that way, the water is removed from the crude ethylene glycol stream so that the equilibrium of the esterification reaction can be pushed further towards complete conversion of the acid contaminant and the required maximum level of acid contaminant for the specification can be met. Removing the other 'low boilers', such as methanol, may be advantageous in reducing the flowrates through the reaction zone and later separations, thus reducing equipment size and cost, and in improving reaction rates by removing a potential diluent from the flow.

It may then also be desirable to remove water either from the reaction zone, for example by using a reaction zone that permits continuous water removal, or in an intermediate step between two reaction zones. The latter may be particularly desirable in that a separation step that would be provided anyway, such as a distillation column for removing components lighter than MEG, can potentially be used as the intermediate step for removing the water. Thus, the process preferably comprises reacting the acid contaminant with the MEG, or with the at least one of the MEG or the DEG, to form the ester in two reaction zones, with water removal between the two reaction zones. The water removal is preferably carried out in a distillation column. Preferably the distillation column also removes at least one component other than water that has a lower boiling point than MEG. For convenience of reference, such a separation step may be termed in this application a crude MEG separation and, where the crude MEG separation is a distillation column, it may be termed a crude MEG distillation column. In a particularly preferable embodiment, the crude ethylene glycol stream comprises a light ester, i.e. an ester having a boiling point lower than MEG, and the crude MEG separation removes the light ester and water from the MEG, and the DEG if present. For example, the crude MEG distillation column may receive a stream comprising the MEG, the DEG if present, unreacted acid contaminant, the ester, the light ester and the water from a first of the reaction zones and may separate the light ester and the water into an overhead stream and the MEG, the DEG if present, the unreacted acid contaminant and the ester into a crude MEG stream. The crude MEG stream is then preferably passed to a second of the reaction zones where the unreacted acid contaminant reacts with the MEG, or the DEG, to form more of the ester. In that way the equilibrium of the esterification reaction is pushed further towards complete conversion of the acid contaminant and the acid contaminant level can be reduced sufficiently to satisfy the maximum level specified in the specification.

In some embodiments, water may be removed directly from the reaction zone. The water removal is preferably continuous. The water removal would drive the equilibrium towards high conversion of the acid contaminant. Such a reaction zone may, for example, comprise a stirred tank reactor with an overhead vapour removal for continuous removal of water. In such cases, it may be beneficial to combine the functions of the low boiler separation and crude MEG separation discussed above into a single separation. That is because there would now be no need for separate water removal both upstream of the reaction zone and between reaction zones and all components with boiling points below MEG, for example, water, alkanol and light ester, could be removed in a low boiler separation upstream of the reaction zone. Water would then be continuously removed from the reaction zone. In such embodiments, while multiple reaction zones could be used, a single reaction zone with water removal would be preferably. Such embodiments might save cost from the combination of the low boiler separation and crude MEG separation into a single separation, but might involve greater costs in the reaction zone designed for water removal.

The at least one reaction zone preferably comprises a catalyst. While the esterification of the acid contaminant with the MEG, or DEG, could potentially be auto-catalysed by the acid contaminant itself, the amount of acid contaminant present will typically be too low for effective auto-catalysis. The catalyst is preferably chosen so as to promote the esterification reaction of the acid contaminant with the MEG, or DEG, whilst not promoting, or promoting only to a lesser extent, the formation of ethers, for example by the reaction of MEG with MEG. Whilst some ether formation, for example the formation of some DEG, can be tolerated, particularly if DEG is present in the crude ethylene glycol stream and is a product of the process, the formation of long chain ethers or excessive DEG formation leading to the formation of dioxanones will result in product loss. Etherification is typically promoted by stronger acids and higher temperatures than esterification and the catalyst is preferably therefore an acid catalyst that is strong enough to promote esterification but not strong enough to promote significant etherification. Similarly, the temperature is preferably high enough to promote esterification at an acceptable rate, but not so high as to promote significant etherification.

Preferred catalysts include silica, resin, zeolites and silica-alumina. Preferably the resin catalyst is a partially surface sulphonated resin, for example a sulphonated divinyl benzene styrene co-polymeric or PTFE resin. Such resins may promote the esterification. However, non-sulphur containing catalysts, such as silica, zeolites and silica-alumina may also be advantageous in that no sulphur can leach from such catalysts. Leached sulphur may need to be removed from recycle streams, particularly to hydrogenations, as sulphur contaminants may affect the performance of hydrogenation catalysts. Such sulphur removal is avoided if non-sulphur containing catalysts are used. Heteropoly acids may also be used as catalysts. The catalyst is preferably a heterogeneous catalyst, preferably in a fixed bed. A heterogeneous catalyst is advantageous in that separation steps for removing the catalyst are not required.

Preferably the temperature in the reaction zone is from 50° C. to 200° C., more preferably from 50° C. to 160° C.

In some embodiments the temperature may be from 50° C. to 90° C., preferably from 60° C. to 80° C. Such temperature ranges may be particularly suitable for use with resin catalysts.

In some embodiments the temperature may be from 140° C. to 170° C., preferably from 150° C. to 160° C. Such temperature ranges may be particularly suitable for catalysts such as silica or silica/alumina or for high temperature resins such as, for example, the WK10 or WK11 series from DIAION. An advantage of using those temperatures is that those temperatures may match the temperature of the crude MEG distillation column and thus no heating or cooling of the streams between the reaction zones and the crude MEG distillation column would be required.

Preferably the crude ethylene glycol stream is produced by hydrogenating a stream comprising methyl glycolate. The present invention may be particularly advantageous in treating streams from such a hydrogenation. That is because the crude ethylene glycol stream from such a hydrogenation is likely to contain methoxyacetic acid (MAA), which has a similar boiling point to MEG and is therefore difficult to remove by conventional separation techniques such a distillation in an economical way. The present invention esterifies the MAA to produce ethylene glycol methoxy acetate (EGMA), which has a higher boiling point than MAA and is more easily separated from MEG by distillation. Preferably the EGMA is recycled to the hydrogenation. There it will be converted to MEG and 2-methoxy ethanol. In that way, the yield of MEG from the process is not reduced, and may even be increased since material that would have been lost as MAA is now being converted back to MEG.

Preferably the stream comprising methyl glycolate is produced by esterification of glycolic acid and methanol. The present invention may be particularly advantageous in processes of that type. The esterification of glycolic acid with methanol will typically not proceed to 100% conversion, and it may not be economical to achieve such a conversion even if it would, so some unconverted glycolic acid will typically slip, i.e. pass downstream, from the esterification to the hydrogenation. If the glycolic acid is not removed in the hydrogenation it will be present in the crude ethylene glycol stream and will need removing during the refining process if the acid specification for the product is to be met. However, glycolic acid has a similar boiling point to DEG and may therefore be difficult to separate using conventional separation technology such as distillation. While the hydrogenation may be operated so as to remove the unconverted glycolic acid by hydrogenation to MEG, doing so may place strain on the operating conditions of the hydrogenation and require it to run at conditions close to those at which the hydrogenation catalyst is damaged. Careful control of the hydrogenation conditions may therefore be required, with little scope for changing the conditions to effect control changes. By contrast, the present invention can remove the glycolic acid during the refining process and there is thus no need to operate the hydrogenation so as to remove the glycolic acid. It may be that, in a process of the present invention, the hydrogenation is operated so as to convert not more than 99% and preferably not more than 98% of the glycolic acid in the stream comprising methyl glycolate to MEG, with the remaining unconverted glycolic acid being removed in the refining process. Operating at such a conversion may allow more benign operating conditions in the hydrogenation, leading to enhanced catalyst stability and life and giving more scope for control variations without damaging the hydrogenation catalyst. Preferably the hydrogenation is operated so as to convert at least 96% of the glycolic acid in the stream comprising methyl glycolate to MEG. Converting in the range of from 96% to 99% of the glycolic acid in the stream comprising methyl glycolate to MEG may be a particularly advantageous operating window in that it achieves a good yield of MEG whilst allowing scope for control variations without damaging the catalyst.

Thus, the acid contaminant preferably comprises one or more of methoxyacetic acid or glycolic acid. The acid contaminant is preferably methoxyacetic acid.

Preferably the glycolic acid used in the production of methyl glycolate by esterification of glycolic acid and methanol is produced by a hydrocarboxylation reaction between formaldehyde and carbon monoxide.

Preferably the process further comprises collecting a low-acid stream from the at least one reaction zone and passing it to at least one further separation in which the MEG, and DEG if present, are separated from the ester. The low-acid stream is so-called because it has a reduced acid content compared to the crude ethylene glycol stream. That is because the acid contaminant has been reacted to form the ester in the at least one reaction zone. Preferably the at least one further separation separates the low-acid stream into at least a MEG product stream comprising MEG and a recycle stream comprising the ester. Where DEG is present, preferably the at least one further separation separates the low-acid stream into at least a MEG product stream comprising MEG, a DEG product stream comprising DEG and a recycle stream comprising the ester. The MEG product stream preferably comprises at least 99% (m/m), more preferably at least 99.5% (m/m) and most preferably at least 99.9% (m/m) MEG. The DEG product stream preferably comprises at least 99% (m/m), more preferably at least 99.5% (m/m) and most preferably at least 99.9% (m/m) DEG. Preferably the DEG product stream comprises not more than 0.2% (m/m) water, not more than 0.5% (m/m) MEG and not more than 1.0% (m/m) triethylene glycol (TEG). The recycle stream comprising the ester is preferably recycled to a point upstream in the process, preferably a hydrogenation, to at least partially convert the ester to MEG. The recycle stream comprising the ester may also comprise sulphur contaminants, for example if a sulphonated resin catalyst is used. The process may therefore comprise passing the recycle stream through a sulphur removal process. That may be particularly beneficial where the recycle stream is recycled to a hydrogenation as sulphur may affect the performance of the hydrogenation catalyst. In some embodiments all or part of the recycle stream may be sent to a purge. Preferably the low-acid stream is sent to a first separation, for convenience of reference this may be termed a MEG product separation in this application, in which the MEG product stream is separated. Preferably the MEG product separation is a distillation column, termed a MEG product distillation column for ease of reference in this application, and the MEG product stream is preferably recovered as a side draw from the MEG product distillation column. A stream comprising the ester and, where present, the DEG is preferably also recovered from the MEG product separation, preferably from the bottom of the MEG product distillation column. Where DEG is present, the stream comprising the DEG and the ester is preferably passed to a further separation zone in which the DEG product stream is recovered. The recycle stream is preferably also recovered from the further separation zone. A stream comprising components with lower boiling points than DEG may also be recovered from the further separation zone. By allowing some DEG to slip into the recycle stream and the stream comprising components with lower boiling points than DEG, high DEG purity may be achieved in the DEG product stream. The stream comprising components with lower boiling points than DEG will typically comprise at least some MEG, because MEG will typically be allowed to slip into the stream comprising the DEG and the ester in the MEG product separation so as to achieve high MEG purity in the MEG product stream. The stream comprising components with lower boiling points than DEG is therefore preferably recycled to the MEG product separation. In that way, the MEG is not lost. The further separation zone preferably comprises two separations, which are preferably two distillation columns. The two separations may, for example, be combined into a single distillation column, for example a divided wall distillation column. A first of the two separations may remove the stream comprising components with lower boiling points than DEG, preferably as an overhead stream from a distillation column. A second of the two separations may remove the recycle stream, preferably as a bottom stream from a distillation column. The first and second of the two separations may be in either order. The DEG product stream is preferably recovered from the downstream of the two separations. Thus, if the first of the two separations is upstream of the second of the two separations, the DEG product stream is preferably removed from the second of the two separations, preferably as an overhead stream. If the second of the two separations is upstream of the first of the two separations, the DEG product stream is preferably removed from the first of the two separations, preferably as a bottom stream.

A stream comprising components with lower boiling points than MEG is preferably recovered from the MEG product separation and preferably recycled to be added to the crude ethylene glycol stream. The stream comprising components with lower boiling points than MEG is preferably recovered as an overhead stream from the MEG product distillation column.

Preferably some MEG is allowed to slip into the stream comprising components with lower boiling points than MEG and into the stream comprising the DEG, if present, and the ester. In that way a high purity of MEG may be achieved in the MEG product stream.

In some embodiments an alkali may be added downstream of the reaction zones to at least partially neutralise unreacted acid contaminant. For example, the alkali may be added in the MEG product separation. The advantage of adding alkali downstream of the reaction zones is that less alkali may be needed than if alkali addition is the only method for removing the acid contaminant and it may therefore be possible to operate with smaller purges whilst still avoiding build-up of the alkali or its derivatives in recycle loops. Preferably the alkali is sodium hydroxide.

A further advantage of the present invention is that removing the acid contaminant upstream of the separations, such as distillation columns, used to separate and purify the MEG, and the DEG if present, means that more economical construction materials can be used in those separations. The presence of acid contaminants may require the use of expensive corrosion-resistant materials. By converting the acid contaminants to esters upstream of the separations, the use of such materials can be avoided.

According to a second aspect of the invention, there is provided a process for producing monoethylene glycol, the process comprising hydrogenating a stream comprising methyl glycolate to produce a crude ethylene glycol stream comprising monoethylene glycol and an acid contaminant and passing the crude ethylene glycol stream to a process according to the first aspect of the invention.

The acid contaminant is preferably selected from methoxyacetic acid, glycolic acid and combinations thereof.

According to a third aspect of the invention, there is provided a process for producing monoethylene glycol and diethylene glycol, the process comprising hydrogenating a stream comprising methyl glycolate to produce a crude ethylene glycol stream comprising monoethylene glycol, diethylene glycol and an acid contaminant and passing the crude ethylene glycol stream to a process according to the first aspect of the invention.

The acid contaminant is preferably selected from methoxyacetic acid, glycolic acid and combinations thereof.

According to a fourth aspect of the invention, there is provided a process for producing monoethylene glycol, the process comprising esterifying glycolic acid with methanol to produce a stream comprising methyl glycolate and passing the stream comprising methyl glycolate to a process according to the second aspect of the invention.

According to a fifth aspect of the invention, there is provided a process for producing monoethylene glycol and diethylene glycol, the process comprising esterifying glycolic acid with methanol to produce a stream comprising methyl glycolate and passing the stream comprising methyl glycolate to a process according to the third aspect of the invention.

According to a sixth aspect of the invention, there is provided a process for producing monoethylene glycol, the process comprising reacting formaldehyde with carbon monoxide to produce a stream comprising glycolic acid and passing the stream comprising glycolic acid to a process according to the fourth aspect of the invention.

According to a seventh aspect of the invention, there is provided a process for producing monoethylene glycol and diethylene glycol, the process comprising reacting formaldehyde with carbon monoxide to produce a stream comprising glycolic acid and passing the stream comprising glycolic acid to a process according to the fifth aspect of the invention.

It will be appreciated that features described in relation to one aspect of the invention may be equally applicable in another aspect of the invention. For example, features described in relation to the first of the invention, may be equally applicable to the second, third, fourth, fifth, sixth and seventh aspects of the invention, and vice versa. Some features may not be applicable to, and may be excluded from, particular aspects of the invention.

DESCRIPTION OF THE DRAWINGS

Embodiments of the present invention will now be described, by way of example, and not in any limitative sense, with reference to the accompanying drawings, of which.

DETAILED DESCRIPTION

Figure 1:
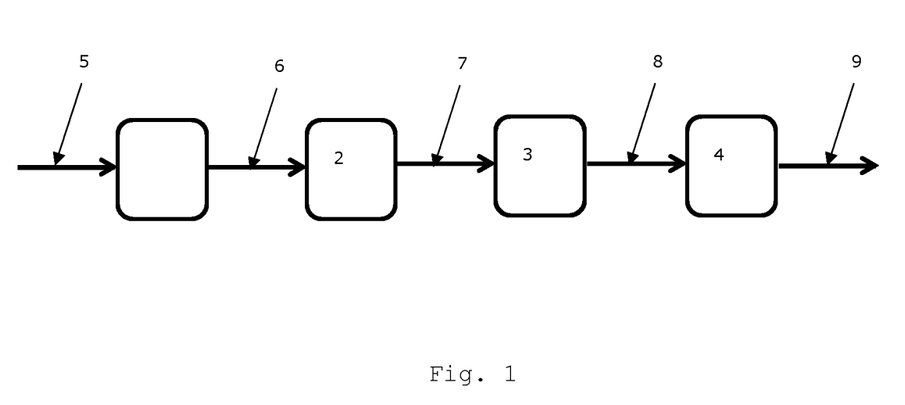
FIG. 1 is a schematic of a process according to the invention.

In FIG. 1 carbon monoxide and formaldehyde are fed 5 either separately or together to a carbonylation reaction 1 in which the carbon monoxide and formaldehyde react to form glycolic acid. The resulting glycolic acid is fed 6 to an esterification 2 with methanol in which the glycolic acid is esterified to methyl glycolate. The methyl glycolate is fed 7 to a hydrogenation 3 in which the methyl glycolate is reacted with hydrogen to form MEG. DEG may also be formed. Acid contaminants, including MAA and glycolic acid are also produced. The product from the hydrogenation 3 is fed 8 to a purification step 4 in which the acid contaminants are esterified with one or both of the MEG and DEG and separated therefrom. Product stream 9 is produced containing purified MEG. A further product stream containing purified DEG may also be produced.

Figure 2:
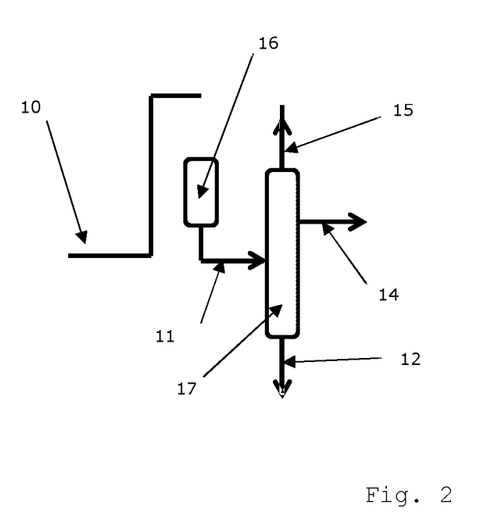
FIG. 2 is a schematic of a process according to the invention.

In FIG. 2 a purification system is shown. Crude ethylene glycol stream 10 comprises MEG and acid contaminants, including MAA and glycolic acid. Crude ethylene glycol stream 10 may also comprise DEG. In this embodiment, crude ethylene glycol stream 10 comprises 900 ppm MAA and 6500 ppm glycolic acid. The crude ethylene glycol stream 10 is fed to an esterification reactor 16 in which the acid contaminants are esterified by reaction with the MEG. In this embodiment the esterification reactor 16 operates at 60-80° C. with a resin catalyst. The crude ethylene glycol stream 10 may be passed through a cooler upstream of the esterification reactor 16 in order to lower the temperature of the crude ethylene glycol stream 10 to a suitable inlet temperature for the esterification reactor 16. To maximise the energy efficiency of the process, the cooler may comprise two stages. In the first stage the crude ethylene glycol stream 10 may be passed through an interchanger, where it is cooled by heat exchange with the cold stream 11 leaving the esterification reactor. In the second stage, the partially cooled stream leaving the interchanger is further cooled to the suitable inlet temperature for the esterification reactor by heat transfer to a cooling medium (e.g. water or air). Stream 11 leaving the esterification reactor is reheated as it passes through the interchanger.

The resin catalyst and conditions are chosen so as to limit the formation of DEG. Water may be removed from the esterification reactor 16 so as to increase the conversion of the acid contaminants. The outlet stream 11 from the esterification reactor 16 is fed to a distillation column 17. An MEG product stream 14 is taken as a side draw from the distillation column 17. In this embodiment, the level of acid contaminants in the MEG product stream 14 is less than 10 ppm. An overhead stream 15 from the distillation column 17 comprises components lighter than MEG. In order to obtain high MEG purity in the MEG product stream 14, some MEG may be allowed to slip into the overhead stream 15. The overhead stream 15 is therefore preferably recycled, optionally with a purge, and fed back into the crude ethylene glycol stream 10. In that way, the MEG in the overhead stream 15 is not lost. Bottoms stream 12 comprises components heavier than MEG, including the esters produced from the esterification of the acid contaminants. Bottoms stream 12 may be sent for further processing to recover valuable components, such as DEG for example, or may be recycled to an upstream hydrogenation, or otherwise removed from the process. The recycled stream may optionally be passed through a sulphur-removal system, for example if the resin catalyst is sulphonated and leaches sulphur.

Figure 3:
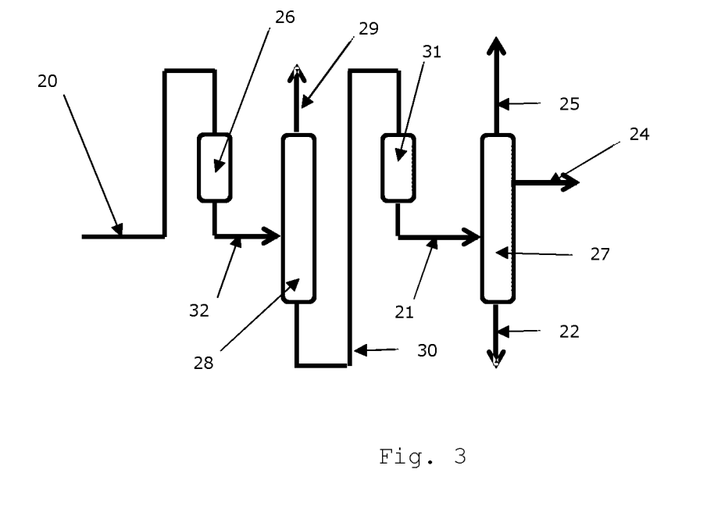
FIG. 3 is a schematic of a process according to the invention.

In FIG. 3 a purification system is shown. Crude ethylene glycol stream 20 comprises MEG and acid contaminants, including MAA and glycolic acid. Crude ethylene glycol stream 20 may also comprise DEG. In this embodiment, crude ethylene glycol stream 20 comprises 900 ppm MAA and 6500 ppm glycolic acid. The crude ethylene glycol stream 20 is fed to an esterification reactor 26 in which the acid contaminants are esterified by reaction with the MEG. In this embodiment the esterification reactor 26 operates at 60-80° C. with a resin catalyst. Around 95% (m/m) of the MAA is converted in the esterification reactor 26. The crude ethylene glycol stream 20 may be passed through a cooler upstream of the esterification reactor 26 in order to lower the temperature of the crude ethylene glycol stream 20 to a suitable inlet temperature for the esterification reactor 26. The resin catalyst and conditions are chosen so as to limit the formation of DEG. The outlet stream 32 from esterification reactor 26 is fed to a distillation column 28. In the distillation column 28 water and other light components are removed in an overhead stream 29. The bottom stream 30 from the distillation column 28 is fed to a further esterification reactor 31 in which remaining acid contaminants are esterified by reaction with the MEG. The further esterification reactor 31 comprises a resin catalyst and operates at around 60-80° C. Around 95% of the remaining MAA is converted in the further esterification reactor 31. The resin catalyst and temperature range are again chosen to reduce the production of DEG. DEG production involves the production of water, which is detrimental to the conversion level of the acid contaminants. The provision of two esterification reactors 26 and 31, with intermediate water removal in distillation column 28, preferably means that water removal from the esterification reactors 26 and 31 is not required. That simplifies the design, and cost, of the esterification reactors 26 and 31 and the distillation column 28 can serve other useful purposes in the separation by removing other light components along with the water. Prior art separation processes may already include a column suitable to function as distillation column 28 and the process of the invention may therefore be implemented by inserting the esterification reactor 26 upstream of that column and the further esterification reactor 31 downstream of that column. The outlet stream 21 from the further esterification reactor 31 is fed to a distillation column 27. An MEG product stream 24 is taken as a side draw from the distillation column 27. In this embodiment, the level of acid contaminants in the MEG product stream 24 is less than 10 ppm. An overhead stream 25 from the distillation column 27 comprises components lighter than MEG. In order to obtain high MEG purity in the MEG product stream 24, some MEG may be allowed to slip into the overhead stream 25. The overhead stream 25 is therefore preferably recycled, optionally with a purge, and fed back into the crude ethylene glycol stream 20. In that way, the MEG in the overhead stream 25 is not lost. Bottoms stream 22 comprises components heavier than MEG, including the esters produced from the esterification of the acid contaminants. Bottoms stream 22 may be sent for further processing to recover valuable components, such as DEG for example, or may be recycled to an upstream hydrogenation or otherwise removed from the process.

Figure 4:
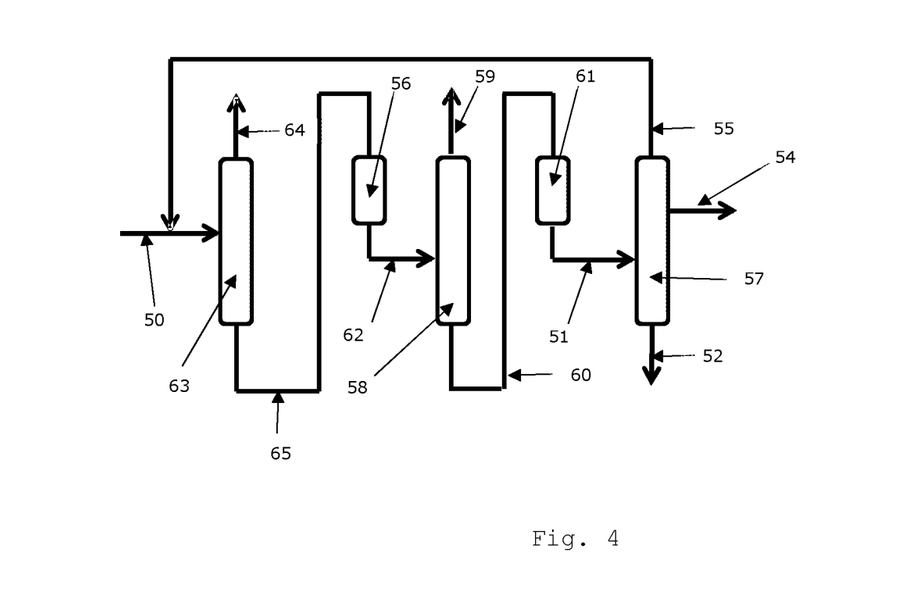
FIG. 4 is a schematic of a process according to the invention.

In FIG. 4 a purification system is shown. Crude ethylene glycol stream 50 comprises MEG and acid contaminants, including MAA and glycolic acid. Crude ethylene glycol stream 50 may also comprise DEG. In this embodiment, crude ethylene glycol stream 50 comprises 900 ppm MAA and 6500 ppm glycolic acid. The crude ethylene glycol stream 50 is fed to a water removal distillation column 63. An overhead stream 64 from the water removal distillation column 64 comprises water and, if methanol is present in the crude ethylene glycol stream, for example from methyl glycolate production, methanol. Bottoms stream 65 from the water removal distillation column 63 comprises the MEG, DEG if present, and the acid contaminants. Bottoms stream 65 is fed to an esterification reactor 56 in which the acid contaminants are esterified by reaction with the MEG. In this embodiment the esterification reactor 56 operates at 150-160° C. with a silica catalyst. Around 95% (m/m) of the MAA is converted in the esterification reactor 56. The bottoms stream 65 may be passed through a cooler upstream of the esterification reactor 56 in order to lower the temperature of the bottoms stream 65 to a suitable inlet temperature for the esterification reactor 56. The silica catalyst and conditions are chosen so as to limit the formation of DEG. The silica catalyst also does not leach any sulphur. The outlet stream 62 from esterification reactor 56 is fed to a distillation column 58. In the distillation column 58 water and other light components are removed in an overhead stream 59. The bottom stream 60 from the distillation column 58 is fed to a further esterification reactor 61 in which remaining acid contaminants are esterified by reaction with the MEG. The further esterification reactor 61 comprises a silica catalyst and operates at around 150-160° C. Around 95% of the remaining MAA is converted in the further esterification reactor 61. The resin catalyst and temperature range are again chosen to reduce the production of DEG. DEG production involves the production of water, which is detrimental to the conversion level of the acid contaminants. The provision of two esterification reactors 56 and 61, with intermediate water removal in distillation column 58, preferably means that water removal from the esterification reactors 56 and 61 is not required. That simplifies the design, and cost, of the esterification reactors 56 and 61 and the distillation column 58 can serve other useful purposes in the separation by removing other light components along with the water. Prior art separation processes may already include a column suitable to function as distillation column 58 and the process of the invention may therefore be implemented by inserting the esterification reactor 56 upstream of that column and the further esterification reactor 61 downstream of that column. The outlet stream 51 from the further esterification reactor 61 is fed to a distillation column 57. An MEG product stream 54 is taken as a side draw from the distillation column 57. In this embodiment, the level of acid contaminants in the MEG product stream 54 is less than 10 ppm. An overhead stream 55 from the distillation column 57 comprises components lighter than MEG. In order to obtain high MEG purity in the MEG product stream 54, some MEG may be allowed to slip into the overhead stream 55. The overhead stream 25 is therefore recycled, optionally with a purge, and fed back into the crude ethylene glycol stream 50. In that way, the MEG in the overhead stream 55 is not lost. Bottoms stream 52 comprises components heavier than MEG, including the esters produced from the esterification of the acid contaminants. Bottoms stream 52 may be sent for further processing to recover valuable components, such as DEG for example, or may be recycled to an upstream hydrogenation or otherwise removed from the process.

Figure 5:
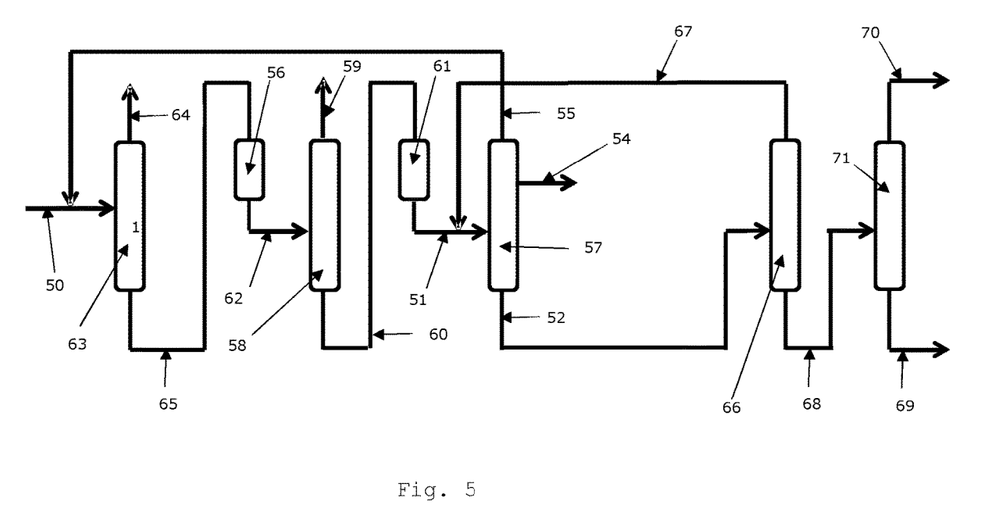
FIG. 5 is a schematic of a process according to the invention comprising the process from FIG. 4 with additional separations.

In FIG. 5, the process of FIG. 4 is repeated, with like numbered items having like meaning, which is not reproduced here. In this embodiment the crude ethylene glycol stream 50 comprises DEG as well as MEG, and the DEG is thus comprised in the bottoms stream 52 from the distillation column 57, along with the esters from the esterification of the acid contaminants, some slipped MEG and other heavy contaminants.

The bottoms stream 52 from the distillation column 57 is passed to a distillation column 66. An overhead stream 67 from distillation column 66 is recycled to be fed into outlet stream 51 from the further esterification reactor 61. The overhead stream 67 comprises MEG and any MEG that was slipped into the bottoms stream 52 is thus recycled to the distillation column 57 and not lost from the process. Bottoms stream 68 from distillation column 66 comprises DEG, the esters from the esterification of the acid contaminants and other heavy contaminants. The bottoms stream 68 is fed to distillation column 71, from which DEG product stream 70 comprising DEG is taken overhead. The DEG product stream 70 may additionally or alternatively be taken as a side draw. A bottoms stream 69 comprising the esters from the esterification of the acid contaminants, some slipped DEG to ensure high purity of DEG in the DEG product stream 70 and other heavy contaminants is removed from the bottom of the distillation column 71. The bottoms stream 69 may be recycled to an upstream hydrogenation or otherwise removed from the process.

It will be appreciated by persons skilled in the art that the above embodiments have been described by way of example only, and not in any limitative sense, and that various alterations and modifications are possible without departure from the scope of the invention as defined by the appended claims. For example, embodiments described as using a resin catalyst could alternatively be operated using a silica catalyst or vice versa. Other catalysts, such as silica-alumina or zeolites, could also be used. The process of FIG. 5 could be rearranged so that the esters from the esterification of the acid contaminants are removed as a bottoms stream in a first distillation column, with a stream comprising the MEG and DEG being taken overhead and sent to a second column in which the MEG and DEG are separated. The columns could also potentially be combined, for example as a split wall column.

The invention claimed is:

1. A process for refining a crude ethylene glycol stream comprising monoethylene glycol and at least one acid contaminant, the process comprising reacting the acid contaminant with the monoethylene glycol in at least one reaction zone to form an ester via an esterification reaction and removing the ester in a separation step, wherein the at least one reaction zone comprises a catalyst to promote said esterification reaction.

2. The process according to claim 1, wherein the crude ethylene glycol further comprises diethylene glycol, and the process comprises reacting the acid contaminant with the diethylene glycol.

3. The process according to claim 1, wherein the crude ethylene glycol stream further comprises water and the process includes a water removal step before the reaction zone.

4. The process according to claim 3, wherein the monoethylene glycol, and diethylene glycol if present, are produced by hydrogenation of alkyl glycolate, which is in turn produced by esterification of glycolic acid with an alkanol.

5. The process according to claim 4, wherein the crude ethylene glycol stream further comprises the alkanol and the alkanol and water are removed in the water removal step.

6. The process according to claim 1, wherein water is removed from the reaction zone.

7. The process according to claim 1 wherein the process comprises reacting the acid contaminant with the monoethylene glycol and optionally also with diethylene glycol if diethylene glycol is present, to form the ester in two reaction zones, with water removal between the two reaction zones.

8. The process according to claim 7, wherein the crude ethylene glycol stream further comprises a light ester having a boiling point lower than monoethylene glycol and the water removal also removes the light ester.

9. The process according to claim 1 wherein the catalyst of the at least one reaction zone is selected from silica, partially sulphonated resin, zeolites and silica-alumina.

10. The process according to claim 9 wherein the catalyst is a partially sulphonated resin and the temperature in the reaction zone is from 50° C. to 90° C.

11. The process according to claim 9 wherein the catalyst is a silica or silica-alumina catalyst and the temperature in the reaction zone is from 140° C. to 170° C.

12. The process according to claim 1 wherein the crude ethylene glycol stream is produced by hydrogenating a stream comprising methyl glycolate.

13. The process according to claim 12, wherein the stream comprising methyl glycolate is produced by esterification of glycolic acid and methanol.

14. The process according to claim 13, wherein the stream comprising methyl glycolate further comprises glycolic acid and the hydrogenating is operated so as to convert not more than 99% of the glycolic acid to monoethylene glycol.

15. The process according to claim 13, wherein the glycolic acid used in the production of methyl glycolate by esterification of glycolic acid and methanol is produced by a hydrocarboxylation reaction between formaldehyde and carbon monoxide.

16. The process according to claim 1, wherein the acid contaminant comprises one or more of methoxyacetic acid or glycolic acid.

17. The process according to claim 1, wherein the acid contaminant is methoxyacetic acid.

18. The process according to claim 1, wherein the process further comprises collecting a low-acid stream from the at least one reaction zone and passing it to at least one further separation which separates the low-acid stream into at least a monoethylene glycol product stream comprising monoethylene glycol and a recycle stream comprising the ester.

19. The process according to claim 18, wherein the monoethylene glycol product stream comprises at least 99.9% (m/m) monoethylene glycol.

20. The process according to claim 18, wherein the at least one further separation separates the low-acid stream into at least the monoethylene glycol product stream comprising monoethylene glycol, a diethylene glycol product stream comprising diethylene glycol and the recycle stream comprising the ester.

21. The process according to claim 20, wherein the diethylene glycol product stream comprises at least 99.9% (m/m) diethylene glycol.

22. A process for producing monoethylene glycol, the process comprising hydrogenating a stream comprising methyl glycolate to produce a crude ethylene glycol stream comprising monoethylene glycol and an acid contaminant and passing the crude ethylene glycol stream to a process according to claim 1.

23. A process for producing monoethylene glycol and diethylene glycol, the process comprising hydrogenating a stream comprising methyl glycolate to produce a crude ethylene glycol stream comprising monoethylene glycol, diethylene glycol and an acid contaminant and passing the crude ethylene glycol stream to a process according to claim 1.

24. A process for producing monoethylene glycol, the process comprising esterifying glycolic acid with methanol to produce a stream comprising methyl glycolate and passing the stream comprising methyl glycolate to a process according to claim 22.

25. A process for producing monoethylene glycol and diethylene glycol, the process comprising esterifying glycolic acid with methanol to produce a stream comprising methyl glycolate and passing the stream comprising methyl glycolate to a process according to claim 23.

26. A process for producing monoethylene glycol, the process comprising reacting formaldehyde with carbon monoxide to produce a stream comprising glycolic acid and passing the stream comprising glycolic acid to a process according to claim 24.

27. A process for producing monoethylene glycol and diethylene glycol, the process comprising reacting formaldehyde with carbon monoxide to produce a stream comprising glycolic acid and passing the stream comprising glycolic acid to a process according to claim 25.

* * * * *